United States Patent [19]

Day

[11] 4,427,291
[45] Jan. 24, 1984

[54] COMPACT OPTICAL IMAGING APPARATUS

[75] Inventor: Pierce B. Day, Pittsford, N.Y.

[73] Assignee: Eastman Kodak Company, Rochester, N.Y.

[21] Appl. No.: 376,472

[22] Filed: May 10, 1982

[51] Int. Cl.³ .............................................. G03B 27/44
[52] U.S. Cl. ....................................... 355/46; 355/1; 355/51
[58] Field of Search ..................... 355/46, 51, 50, 1

[56] References Cited

U.S. PATENT DOCUMENTS

| | | | |
|---|---|---|---|
| 3,606,535 | 9/1971 | Koizumi | 355/51 |
| 3,655,284 | 4/1972 | Agliata | 355/46 |
| 3,836,249 | 9/1974 | Weber | 355/51 |
| 3,982,833 | 9/1976 | Kolibas | 355/51 |
| 4,316,665 | 2/1982 | Mochizuki et al. | 355/46 |
| 4,357,099 | 11/1982 | Taguchi et al. | 355/46 |

Primary Examiner—Monroe H. Hayes
Attorney, Agent, or Firm—Lawrence P. Kessler

[57] ABSTRACT

Compact optical imaging apparatus for projecting in focus an upright and wrong-reading light image of an information bearing document in an object plane onto a parallel image plane. The apparatus comprises a plurality of lenses located between the object plane and the image plane for projecting a plurality of overlapping segments of a light image along an optical path. A light image of an information bearing document in the object plane is directed to the lenses. A plurality of roof mirrors (i) receive such image segments from the lenses, (ii) reverse and invert such image segments, and (iii) reflect the image segments back through the lenses along the path toward the image plane. The image segments are then directed from the lenses to the image plane to form an upright and wrong-reading image of the information bearing document in the image plane.

6 Claims, 5 Drawing Figures

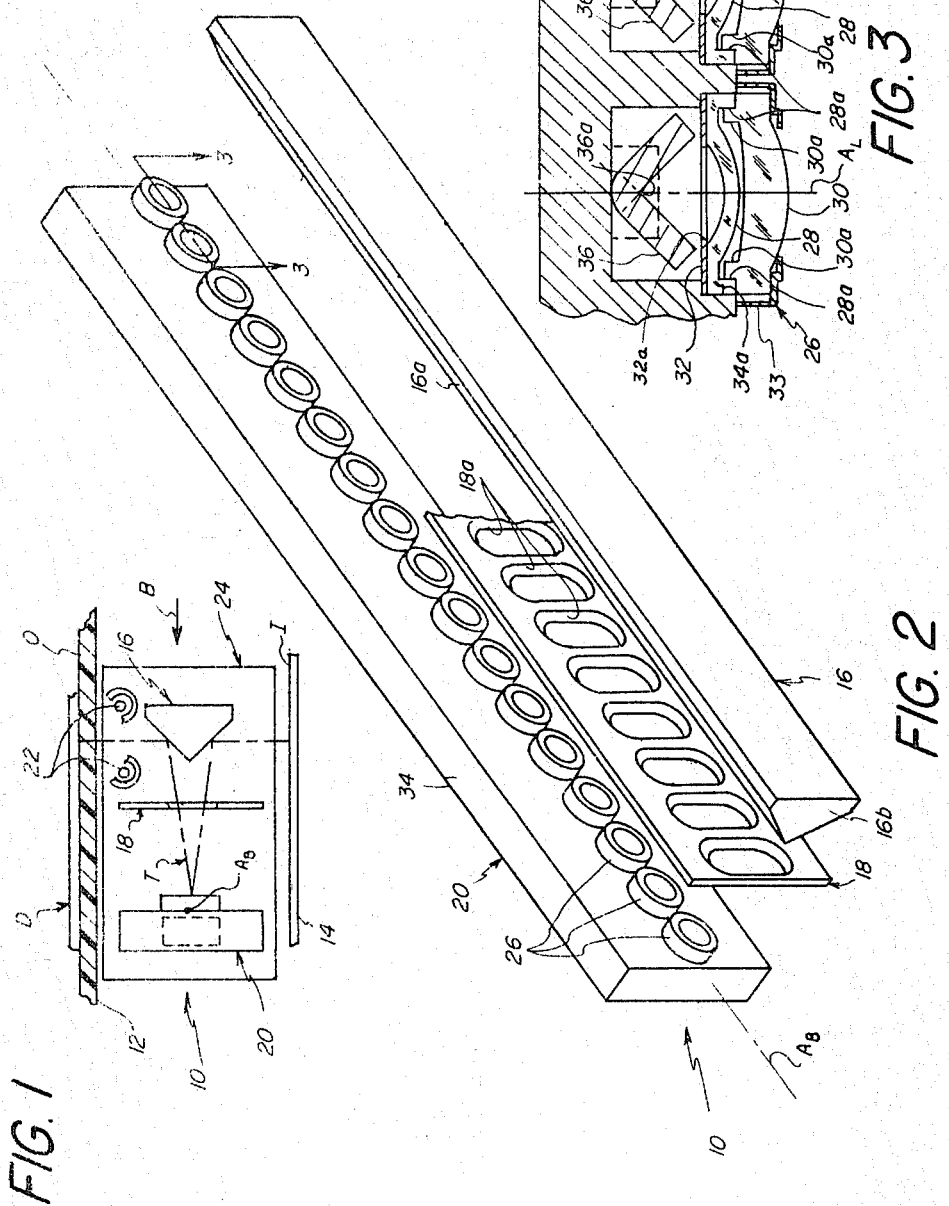

COMPACT OPTICAL IMAGING APPARATUS

BACKGROUND OF THE INVENTION

This invention relates to compact optical imaging apparatus for use, for example, in projecting an image of an information bearing document to a photoconductive member of a compact electrographic copier.

Compact electrographic copiers are designed for personal use and occupy a small space, such as a desk top for example. Such copiers typically produce latent electrostatic images of input information (e.g., a document) on the surface of a photosensitive member. The photosensitive member is, for example, insulative receiver material which has been coated with a photoconductive layer. Such material, when uniformally electrically charged and exposed to a light image of input information, has a latent image electrostatic charge pattern corresponding to such information formed on its surface. The charge pattern is developed with pigmented marking particles, which are fixed to the material to form a reproduction of the input information. However, since such coated receiver material is relatively expensive, it is becoming more popular to employ a reusable photoconductive member.

The reusable photoconductive member is uniformly electrically charged, exposed to a light image of input information to produce the latent image electrostatic charge pattern corresponding to such information, and developed with pigmented marking particles to form a transferable image. The transferable image is subsequently transferred to a receiver material and permanently fixed to the receiver material to form the reproduction. Such photoconductive member is cleaned and can be reused. The receiver material, such as a sheet of plain bond paper, is relatively inexpensive and can be disposed of when the reproduction is no longer needed.

Reduction of the size of copiers using reusable photoconductive members has been difficult to achieve due, at least in part, to the required optics. The image projected to the photoconductive member must be upright and wrong-reading to result in a right-reading reproduction. Generally, optics for accomplishing such proper image orientation have relatively long optical conjugate distances (generally, equal to twice the length of the diagonal of the optically projected image). This accordingly necessitates that the overall size of the copier be relatively large. While there are certain optical arrangements having short optical conjugate distances which orient images upright and wrong-reading at the image plane, such apparatus have critical limitations. For example, fiber optics can produce upright and wrong-reading images, but require small spacing between the entry faces of the fibers and the photoconductive member which can abrade the member. Further, resolution is limited by the fiber diameter, or laminar period, and the spacing of such fibers relative to the photoconductive member. Another relatively short optical conjugate distance optical arrangement is shown in U.S. Pat. No. 3,687,545, issued Aug. 29, 1972 in the name of Moorhusen. The apparatus of such patent still requires enough spacing for parallel lens strips and a prism. Moreover, the strips must be accurately located relative to one another in order that elements in the respective strips are coaxially alligned.

SUMMARY OF THE INVENTION

This invention is directed to a compact optical imaging apparatus for projecting in focus an upright and wrong-reading light image of an information bearing document in an object plane onto a parallel image plane. The apparatus comprises a plurality of lenses located between the object plane and the image plane for projecting a plurality of overlapping segments of a light image along an optical path. A light image of an information bearing document in the object plane is directed to the lenses. A plurality of roof mirrors (i) receive such image segments from the lenses, (ii) reverse and invert such image segments, and (iii) reflect the image segments back through the lenses along the path toward the image plane. The image segments are then directed from the lenses to the image plane to form an upright and wrong-reading image of the information bearing document in the image plane.

The invention, and its objects and advantages, will become more apparent from the detailed description of the preferred embodiment presented below.

BRIEF DESCRIPTION OF THE DRAWINGS

In the detailed description of the preferred embodiment of the invention presented below, reference is made to the accompanying drawings, in which:

FIG. 1 is a schematic side elevational view of a portion of an electrographic copier including the compact optical imaging apparatus according to this invention;

FIG. 2 is an isometric view of the apparatus of FIG. 1, with portions broken away or removed to facilitate viewing;

FIG. 3 is a top plan view, in cross-section of a portion of the apparatus of FIG. 2 taken on lines 3—3 of FIG. 2;

DESCRIPTION OF THE PREFERRED EMBODIMENT

Figure 4:
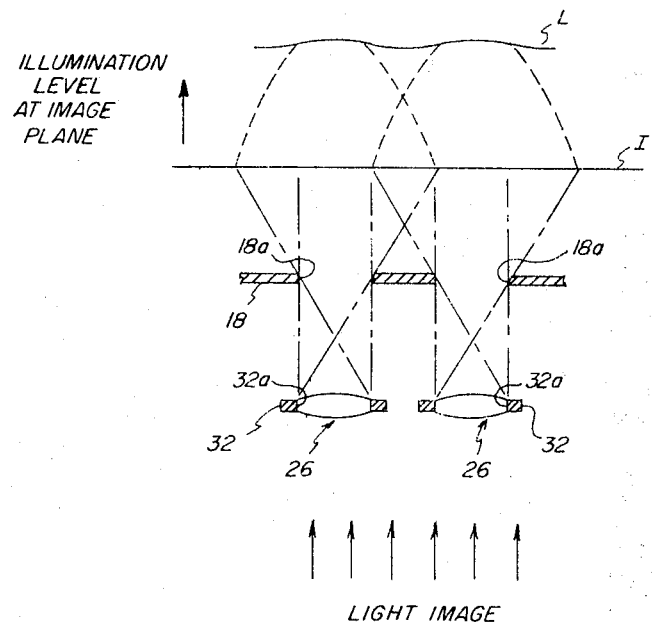
FIG. 4 is a schematic view of a portion of the apparatus of FIG. 2 including a graphical representation of the illumination level at the image plane.

Referring now to the accompanying drawings, FIG. 1 schematically shows a portion of an electrographic copier including the compact optical imaging apparatus 10 for projecting an upright and wrong-reading image of a document from an object plane O onto an image plane I typically parallel to the object plane. The apparatus 10 includes a bi-mirror 16, a light baffle 18, a multiple lens array 20, and lamps 22 mounted in fixed spatial relation on a carriage 24. The carriage 24 is movable in a plane normal to the planes O,I by a reversible drive mechanism, such as shown for example in the aforementioned U.S. Pat. No. 3,687,545.

The multiple lens array 20 includes a lens bar 34 and a plurality of lenslets 26. The lens bar 34 is supported on the carriage 24 so that its longitudinal axis $A_B$ is parallel to the object plane and extends transverse to the direction of movement of the carriage. As best illustrated in FIG. 3, each lenslet 26 includes a pair of elements 28, 30, which form a short focal length retro-focus (half) lens, and a light baffle 32 secured by retainers 33 in the lens bar 34. The lenslets 26 are located in the bar 34 so that the fields of each of the lenslets respectively include only a small segment of the total line image across the object plane, with substantial overlap between adjacent segments. The arrangement of the lenslets in the lens bar 34 yields close alignment between the overlapping projected image segments. The baffle 18 has a plurality of openings 18a associated with the respective lenslets 26 and the baffles 32 each have an opening 32a. The baffles 18 and 32 provide a vignetting effect on the light passing through the lenslets 26. Therefore, in the overlapping of areas of adjacent image segments projected onto the image plane I, there is an additive effect on the transmitted illumination which provides uniformity of the illumination level L across the total line image (see FIG. 4).

The optical axes $A_L$ of the pairs of elements 28, 30 of the lenslets 26 are parallel and respectively perpendicular to a vertical plane through the longitudinal axis $A_B$ of the lens bar 34. Further the lenslets 26 include a plurality of retro-reflecting roof mirrors 36 (i.e., intersecting plano-mirrors having an inclusive right angle). The plurality roof mirrors are supported in the lens bar 34 behind the plurality of pairs of elements 28, 30 respectively. The apexes 36a of the roof mirrors, intersecting the optical axes $A_L$ of the associated pairs elements 28, 30, are perpendicular to such axes respectively and lie in vertical planes through such axes. The bi-mirror 16, associated with the lens array 20, has an apex 16c between the surfaces 16a, 16b parallel to the planes O, I and lying in the horizontal plane including the axes A. The respective angles formed by such horizontal plane and the surfaces 16a, 16b are equal.

The elements 28, 30 are, for example, molded from suitable optical quality plastic. Further the roof mirrors 36 are, for example, molded from suitable reflective plastic. Forming the lenses and roof mirrors using precision plastic molding techniques is cost effective and provides a high degree of uniformity between parts. This also facilitates automatic or manual assembly. For example, the elements are formed with shoulders 28a, 30a which accurately align the elements when they are assembled in recesses 34a in the lens bar 34.

Figure 5:
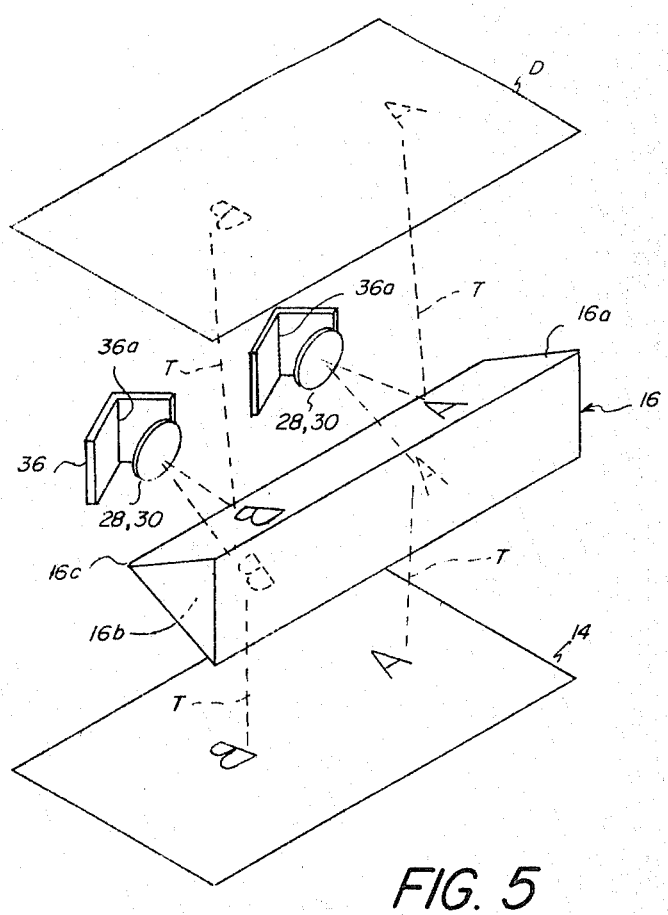
FIG. 5 is an isometric schematic view of a portion of the apparatus of FIG. 1 showing projection of adjacent images from an object plane to an image plane.

A light image from the object plane O is projected by the apparatus 10 to the image plane I along an optical path designated by the rays T of FIGS. 1 and 5. The light image is first directed onto the surface 16a of the bi-mirror 16 where it is inverted. The inverted image is reflected through openings 18a in the light baffle 18 and pairs of elements 28, 30 of lenslets 26 to the roof mirrors 36, and back through the elements and light baffle 18 to the surface 16b of the bi-mirror. The pairs of elements first collimate the light, then recombine the light, after reflection from the roof mirror surfaces, into an inverted and reversed image. The roof mirrors 36 also have the effect of reversing and inverting the image. Finally, the image is reflected from surface 16b of the bi-mirror 16, where it is again inverted, and then directed onto the image plane I. The light image thus goes through two reversals and four inversions which is the even number of inversions and reversals required for the image to be properly oriented upright and wrong-reading in the image plane (one additional inversion results when the image is viewed by reflection from the image plane so that is appears upright and wrong-reading). By the described bi-mirror, lens and roof mirror arrangement, the lens array 20 has a short optical conjugate distance. For example, if the array 20 has seventeen lenslets 26, each of a diameter of 0.5 inches, the conjugate distance is 2.5 inches. This compares to a conjugate distance of 8 inches in prior known optical apparatus.

Accordingly, the short focal length lenses and roof mirrors of the apparatus 10 produce an upright and wrong-reading image of uniform illumination with a substantially reduced conjugate distance. This translates into a marked volumetric reduction in the apparatus 10 so that the apparatus is extremely compact.

The apparatus 10 is used in an electrographic copier such as that shown in U.S. Pat. No. 3,972,609 issued Aug. 3, 1976 in the name of Pfeifer et al for example. The copier has a transparent platen 12, forming the object plane O, and a uniformly electrostatically charged reusable photoconductive member 14, forming the image plane I (see FIG. 1). The platen 12 supports a document D with the information bearing face of the document on the platen. As the carriage 24 is moved in the direction of arrow B of FIG. 1, lamps 22 are turned on and the light from the lamps is directed by reflectors (associated with the lamps respectively) to illuminate the document D. A reflected light image of a moving line segment of the information on the document is thus produced. The apparatus 10, which projects the reflected light image in the manner discussed above, thus scans the document D and projects the reflected light image in focus substantially line-by-line onto the photoconductive member 14.

The uniform electrostatic charge on the photoconductive member 14 is selectively reduced by the reflected light image to form a latent image electrostatic charge pattern, corresponding to such image, on the photoconductive member. Of course, the carriage could remain stationary and the platen and photoconductive member could be moved to effect the same result. Subsequently, the electrostatic charge pattern is developed, such as by transferable pigmented marking particles, to form an image which is upright and wrong-reading. Such image is then transferred to and fixed on a receiver sheet to form an upright, right-reading reproduction of the document D.

The invention has been described in detail with particular reference to a preferred embodiment thereof, but it will be understood that variations and modifications can be effected within the spirit and scope of the invention.

I claim:

1. A compact optical imaging apparatus for projecting in focus an upright and wrong-reading light image of an information bearing document in an object plane onto an image plane, said apparatus comprising:
   a plurality of lenses located between said object plane and said image plane for projecting along an optical path a plurality of overlapping segments of a light image;
   reflection means, located in said optical path between the object plane and said lenses, for directing a light image of an information bearing document in the object plane to said lenses;
   a plurality of roof mirrors associated with said plurality of lenses respectively, said roof mirrors being located in said path to (i) receive such image segments from said lenses, (ii) reverse and invert such image segments, and (iii) reflect the image segments back through said lenses along said path toward the image plane; and
   reflection means, located in said optical path between the image plane and said lenses, for directing such image segments from the lenses to the image plane to form an upright and wrong-reading image of the information bearing document in such plane.

2. The invention of claim 1 wherein said plurality of lenses include a support bar having a longitudinal axis extending transverse to the object plane, and a plurality of lenses supported by said support bar such that the optical axes of such lenses are parallel to one another and lie in a plane parallel to the object plane.

3. The invention of claim 2 wherein said plurality of roof mirrors are supported by said support bar adjacent to said plurality of lens respectively, the apexes of said roof mirrors respectively intersecting the optical axes of said lenses perpendicular thereto and lying in planes perpendicular to the object plane through such optical axes.

4. A compact optical imaging apparatus for projecting in focus an upright and wrong-reading light image of an information bearing document in an object plane onto a parallel image plane, said apparatus comprising:

a plurality of lenses for projecting along an optical path a plurality of overlapping segments of a light image;

means for supporting said lenses between said object plane and said image plane such with the respective optical axes of such lenses parallel to one another and lying in a plane parallel to the object plane;

first reflection means located in said optical path between the object plane and said lenses for directing an inverted light image of an information bearing document in the object plane to said lenses;

a plurality of roof mirrors associated with said plurality of lenses respectively such that the apexes of said roof mirrors intersect the optical axes of said lenses perpendicular to such axes respectively and lie in planes perpendicular to the object plane through such optical axes, whereby said roof mirrors respectively (i) receive such image segments from said lenses, (ii) reverse and invert such image segments, and (iii) reflect the image segments back through said lenses along said path toward the image plane; and second reflection means located between the image plane and said lens elements for directing an inverted light image from the lenses onto the image plane to form an upright and wrong-reading image of the information bearing document in such plane.

5. The invention of claim 4 including a bi-mirror, the apex thereof facing said lenses and lying in the plane including the optical axes of said lenses, and wherein said first reflection means is defined by one surface of said bi-mirror, and said reflection second means is defined by the other surface of said bi-mirror.

6. In a copier having a charged photoconductive member and a platen spaced from the photoconductive member for supporting a document to be reproduced, an improved means for forming on the photoconductive member a developable charge pattern corresponding to an in-focus upright and wrong-reading image of such document, said means comprising:

a plurality of lenses located between said platen and said photoconductive member for projecting a plurality of overlapping segments of a reflected light image of a document supported on said platen along an optical path;

reflection means, located in said optical path between said platen and said lenses, for directing a reflected light image to said lenses;

a plurality of roof mirrors associated with said plurality of lenses respectively, said roof mirrors being located in said path to (i) receive such image segments from said lenses, (ii) reverse and invert such image segments, and (iii) reflect such image segments back through said lenses along said path toward said photoconductive member; and reflection means, located in said optical path between said photoconductive member and said lenses, for directing such image segments from said lenses to said photoconductive member to form on the photoconductive member a developable charge pattern corresponding to an in-focus upright and wrong-reading image of such document.

* * * * *

Disclaimer 4,427,291.—*Pierce B. Day*, Pittsford, N.Y. COMPACT OPTICAL IMAGING APPARATUS. Patent dated Jan. 24, 1984. Disclaimer filed Apr. 26, 1984, by the assignee, *Eastman Kodak Co.*

Hereby enters this disclaimer to claims 1–6 of said patent.
[*Official Gazette July 31, 1984.*]